United States Patent
Otenko

(10) Patent No.: US 9,086,909 B2
(45) Date of Patent: Jul. 21, 2015

(54) SYSTEM AND METHOD FOR SUPPORTING WORK SHARING MUXING IN A CLUSTER

(71) Applicant: Oracle International Corporation, Redwood Shores, CA (US)

(72) Inventor: Oleksandr Otenko, Winnersh (GB)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 13/756,207

(22) Filed: Jan. 31, 2013

(65) Prior Publication Data

US 2014/0215475 A1 Jul. 31, 2014

(51) Int. Cl.
*G06F 9/46* (2006.01)
*G06F 9/54* (2006.01)

(52) U.S. Cl.
CPC . *G06F 9/46* (2013.01); *G06F 9/546* (2013.01)

(58) Field of Classification Search
None
See application file for complete search history.

(56) References Cited

U.S. PATENT DOCUMENTS

| | | | |
|---|---|---|---|
| 5,333,274 A | 7/1994 | Amini et al. | |
| 6,427,161 B1 * | 7/2002 | LiVecchi | 718/102 |
| 7,394,288 B1 | 7/2008 | Agarwal | |
| 7,554,993 B2 | 6/2009 | Modi et al. | |
| 8,131,860 B1 | 3/2012 | Wong et al. | |
| 2003/0110232 A1 | 6/2003 | Chen et al. | |
| 2003/0120822 A1 | 6/2003 | Langrind et al. | |
| 2004/0122953 A1 * | 6/2004 | Kalmuk et al. | 709/227 |
| 2004/0205771 A1 | 10/2004 | Sudarshan et al. | |
| 2005/0021354 A1 | 1/2005 | Brendle et al. | |
| 2005/0027901 A1 | 2/2005 | Simon et al. | |
| 2005/0102412 A1 | 5/2005 | Hirsimaki | |
| 2005/0223109 A1 | 10/2005 | Mamou et al. | |
| 2005/0262215 A1 * | 11/2005 | Kirov et al. | 709/207 |
| 2006/0015600 A1 * | 1/2006 | Piper | 709/223 |
| 2006/0031846 A1 | 2/2006 | Jacobs et al. | |
| 2006/0143525 A1 | 6/2006 | Kilian | |
| 2006/0209899 A1 | 9/2006 | Cucchi et al. | |
| 2006/0248200 A1 | 11/2006 | Stanev | |
| 2007/0156869 A1 * | 7/2007 | Galchev et al. | 709/223 |

(Continued)

FOREIGN PATENT DOCUMENTS

GB 2492653 1/2013

OTHER PUBLICATIONS

European Patent Office International Searching Authority, International Search Report and written opinion dated Feb. 5, 2014 for Application No. PCT/US2013/067286, 10 pages.

(Continued)

*Primary Examiner* — Diem Cao
(74) *Attorney, Agent, or Firm* — Tucker Ellis LLP

(57) ABSTRACT

A system and method can provide efficient low-latency muxing between servers in the cluster. One such system can include a cluster of one or more high performance computing systems, each including one or more processors and a high performance memory. The cluster communicates over an InfiniBand network. The system can also include a middleware environment, executing on the cluster, which includes one or more application server instances. The system can include one or more selectors, wherein each said selector contains a queue of read-ready file descriptors. Furthermore, the system can include a shared queue, wherein the read-ready file descriptors in each said selector can be emptied into the shared queue. Additionally, a plurality of muxer threads operates to take work from said shared queue.

20 Claims, 8 Drawing Sheets

(56) References Cited

U.S. PATENT DOCUMENTS

| | | |
|---|---|---|
| 2007/0198684 A1 | 8/2007 | Mizushima |
| 2007/0245005 A1* | 10/2007 | Banerjee et al. ............... 709/223 |
| 2008/0044141 A1 | 2/2008 | Willis et al. |
| 2008/0163124 A1 | 7/2008 | Bonev et al. |
| 2008/0195664 A1 | 8/2008 | Maharajh et al. |
| 2008/0286741 A1 | 11/2008 | Call |
| 2009/0019158 A1 | 1/2009 | Langen et al. |
| 2009/0024764 A1 | 1/2009 | Atherton et al. |
| 2009/0182642 A1 | 7/2009 | Sundaresan |
| 2009/0327471 A1 | 12/2009 | Astete et al. |
| 2010/0198920 A1 | 8/2010 | Wong et al. |
| 2011/0029812 A1 | 2/2011 | Lu et al. |
| 2011/0055510 A1 | 3/2011 | Fritz et al. |
| 2011/0119673 A1* | 5/2011 | Bloch et al. ................. 718/102 |
| 2011/0246582 A1 | 10/2011 | Dozsa et al. |
| 2012/0066400 A1 | 3/2012 | Reynolds et al. |
| 2012/0066460 A1 | 3/2012 | Bihani et al. |
| 2012/0239730 A1 | 9/2012 | Revanuru et al. |
| 2013/0014118 A1* | 1/2013 | Jones ........................... 718/104 |
| 2014/0059226 A1* | 2/2014 | Messerli et al. .............. 709/226 |

OTHER PUBLICATIONS

Gregory F. Pister, High Performance Mass Storage and Parallel 110, 2002, Chapter 42—An Introduction to the InfiniBand Architecture, IBM Enterprise Server Group, pp. 617-632.

Richard G. Baldwin, "The ByteBuffer Class in Java : Java Programming Notes #1782"., Aug. 20, 2002. 14 pages. Retrieved from: http://www.developer.com/java/other/article.php/1449271/The-ByteBuffer-Class-in-Java.htm.

National Instruments Corporation, What is Scatter-Gather DMA (Direct Memory Access)?, 1 pages retrieved Aug. 29, 2014, from <http://digital.ni.com/public.nsf/allkb/65B0708FE161D8C0852563DA00620887>.

* cited by examiner

```
1   public class Muxer {
2     int MUXERS = ...
3     int SELECTORS = ...
4     BlockingQueue jobs = ...
5
6     public Muxer() {
7       // populate the queue of work with SELECTORS Selectors
8       for( int i = 0; i < SELECTORS; ++i ) jobs.put( Selector.open(...) );
9       // start MUXERS threads
10      for( int i = 0; i < MUXERS; ++i ) new Thread(this).start();
11    }
12
13    public void run() {
14      ArrayList al = ...
15      for(;;) {   // indefinite loop for processing sockets
16        Object o = al.size() == 0 ? jobs.take() : al.remove(0);
17
18        if ( o instanceof Selector ) { // so, we are a selector now
19          Selector sel = (Selector)o;
20          SelectionKey[] readReady = sel.select();
21          al.addAll( readReady );
22          al.add( sel );
23
24          int n = jobs.offerAll( al ); // put as many pieces of work without blocking
25          al.remove(0, n); // remove the pieces of work that were successfully added
26        } else {
27          SelectionKey key = (SelectionKey)o;
28          readReadyChannel( key );
29        }
30      }
31    }
```

*FIGURE 6*

```
1   public class Muxer {
2     int MUXERS = ...
3     int SELECTORS = ....
4     BlockingQueue jobs = ...
5
6     public Muxer() {
7       // populate the queue of work with SELECTORS Selectors
8       for( int i = 0; i < SELECTORS; ++i ) jobs.put( Selector.open(...) );
9       // start MUXERS threads
10      for( int i = 0; i < MUXERS; ++i ) new Thread(this).start();
11    }
12
13    public void run() {
14      ArrayList al = ...
15      for(;;) { // indefinite loop for processing sockets
16        Object o;
17        if ( al.size() == 0 ) o = jobs.take();
18        else {
19          o = al.remove(0);
20          if ( al.size() > 0 ) al.remove(0, jobs.offerAll( al ));
21        }
22
23        if ( o instanceof Selector ) { // so, we are a selector now
24          Selector sel = (Selector)o;
25          SelectionKey[] readReady = sel.select();
26          al.addAll( readReady );
27          al.add( sel );
28        } else readReadyChannel( (SelectionKey)o );
29      }
30    }
31  }
```

FIGURE 7

SYSTEM AND METHOD FOR SUPPORTING WORK SHARING MUXING IN A CLUSTER

CROSS REFERENCE TO RELATED APPLICATIONS

This application is related to the following patent applications, each of which is hereby incorporated by reference in its entirety:

U.S. patent application Ser. No. 13/109,849, filed May 17, 2011, entitled "SYSTEM AND METHOD FOR ZERO BUFFER COPYING IN A MIDDLEWARE ENVIRONMENT;

U.S. patent application Ser. No. 13/170,490, filed Jun. 28, 2011, entitled "SYSTEM AND METHOD FOR PROVIDING SCATTER/GATHER DATA PROCESSING IN A MIDDLEWARE ENVIRONMENT";

U.S. patent application Ser. No. 13/109,871, filed May 17, 2011, entitled "SYSTEM AND METHOD FOR PARALLEL MUXING BETWEEN SERVERS IN A CLUSTER"; and U.S. patent application Ser. No. 13/167,636, filed Jun. 23, 2011, entitled "SYSTEM AND METHOD FOR SUPPORTING LAZY DESERIALIZATION OF SESSION INFORMATION IN A SERVER CLUSTER".

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems and software such as middleware, and, is particularly related to systems and methods for muxing between servers in a cluster.

BACKGROUND

Within any large organization, over the span of many years the organization often finds itself with a sprawling IT infrastructure that encompasses a variety of different computer hardware, operating-systems, and application software. Although each individual component of such infrastructure might itself be well-engineered and well-maintained, when attempts are made to interconnect such components, or to share common resources, it is often a difficult administration task. In recent years, organizations have turned their attention to technologies such as virtualization and centralized storage, and even more recently cloud computing, which can provide the basis for a shared infrastructure. However, there are few all-in-one platforms that are particularly suited for use in such environments. These are the general areas that embodiments of the invention are intended to address.

SUMMARY

Systems and methods are provided for providing efficient low-latency multiplexing (herein referred to as "muxing") between servers in the cluster. One such system can include a cluster of one or more high performance computing systems, each including one or more processors and a high performance memory. The cluster communicates over an InfiniBand network. The system can also include a middleware environment, executing on the cluster, which includes one or more application server instances. The system can include one or more selectors, wherein each said selector contains a queue of read-ready file descriptors. Furthermore, the system can include a shared queue, wherein the read-ready file descriptors in each said selector can be emptied into the shared queue. Additionally, a plurality of multiplexer (herein referred to as "muxer") threads operates to take work from said shared queue.

Other objects and advantages of the present invention will become apparent to those skilled in the art from the following detailed description of the various embodiments, when read in light of the accompanying drawings.

BRIEF DESCRIPTION OF THE FIGURES

FIG. 6 shows an illustration of exemplary pseudo code that supports work sharing muxing in accordance with various embodiments of the invention.

FIG. 7 shows an illustration of other exemplary pseudo code that supports work sharing muxing in accordance with various embodiments of the invention.

DETAILED DESCRIPTION

Described herein are systems and methods that can support work sharing muxing in a cluster.

Figure 1:
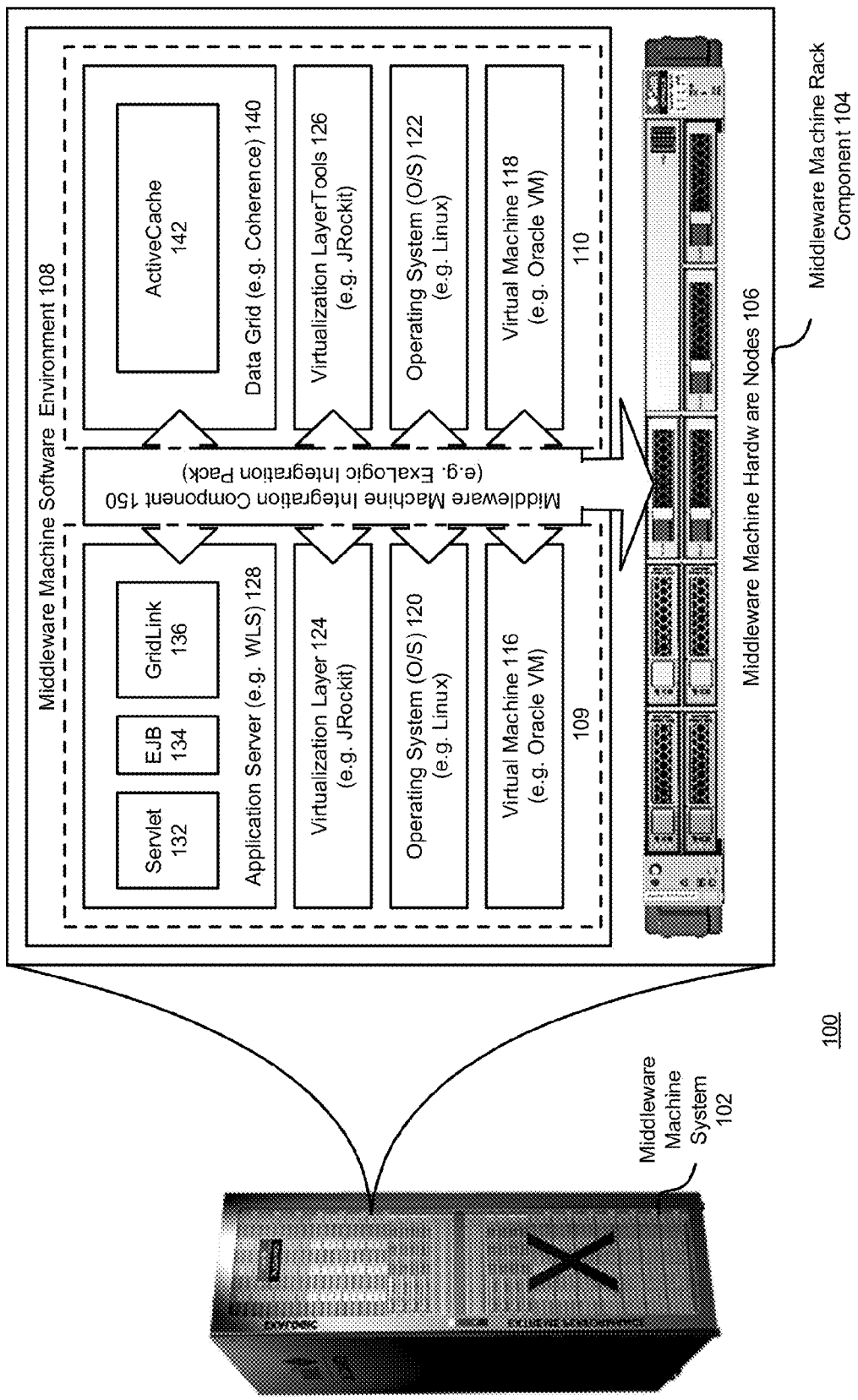
FIG. 1 shows an illustration of a middleware machine environment 100, in accordance with an embodiment of the invention.

FIG. 1 shows an illustration of a middleware machine environment 100, in accordance with an embodiment of the invention. As shown in FIG. 1, each middleware machine system 102 includes several middleware machine rack components 104, each of which includes a combination of high-performance middleware machine hardware nodes 106 (e.g., 64-bit processors, high performance large memory, and redundant InfiniBand and Ethernet networking), and a middleware machine software environment 108. The result is a complete application server environment which can be provisioned in minutes rather than days or months, and which can scale on demand. In accordance with an embodiment, each middleware machine system can be deployed as a full, half, or quarter rack, or other configuration of rack components, and several middleware machine systems can be coupled together, again using InfiniBand, to create larger environments. Each middleware machine software environment can be provisioned with several application server or other software instances, for example as shown in FIG. 1, an application server instance 109 could comprise a virtual machine 116, operating system 120, virtualization layer 124, and application server layer 128 (e.g. WebLogic, including servlet 132, EJB 134, and Gridlink 136 containers); while another application server instance 110 could comprise a virtual machine 118, operating system 122, virtualization layer 126, and data grid layer 140 (e.g. Coherence, including an active cache 142). Each of the instances can communicate with one another, and with both its middleware machine hardware node, and other nodes, using a middleware machine integration component 150, such as an ExaLogic integration pack, which itself provides several optimization features, such as support for InfiniBand and other features, as described in further detail below.

Figure 2:
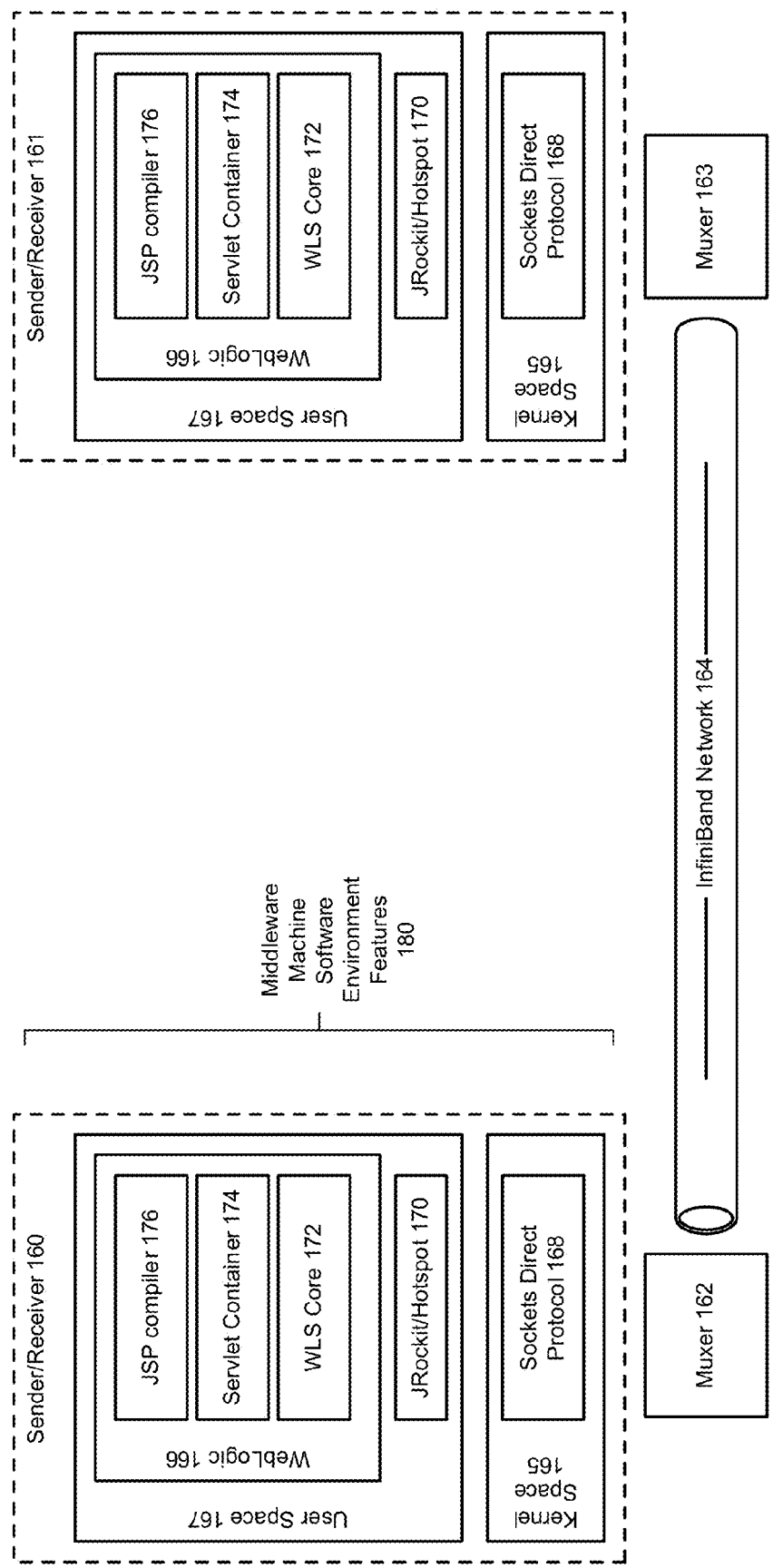
FIG. 2 shows another illustration of a middleware machine platform or environment, in accordance with an embodiment of the invention.

FIG. 2 shows another illustration of a middleware machine platform or environment, in accordance with an embodiment of the invention. As shown in FIG. 2, each application server instance can act as a sender and/or receiver 160, 161 within the middleware machine environment. Each application server instance is also associated with a muxer 162, 163, that allows the application servers to communicate with one another via an InfiniBand network 164. In the example shown in FIG. 2, an application server instance can include a kernel space 165, user space 167, and application server (e.g. WebLogic space) 166, which in turn can be associated with a sockets direct protocol 168, a JVM (e.g. JRockit/Hotspot layer) 170, a WLS core 172, a servlet container 174, and a JSP compiler 176. In accordance with other examples, other combinations of middleware-type software can be included. In accordance with various embodiments, the machine integration component can provide features such as Zero Buffer Copies, Scatter/Gather I/O, T3 Connections, Lazy Deserialization, and GridLink DataSource, to provide the basis for, and improve performance within, the shared infrastructure.

Simple Muxing

Figure 3:
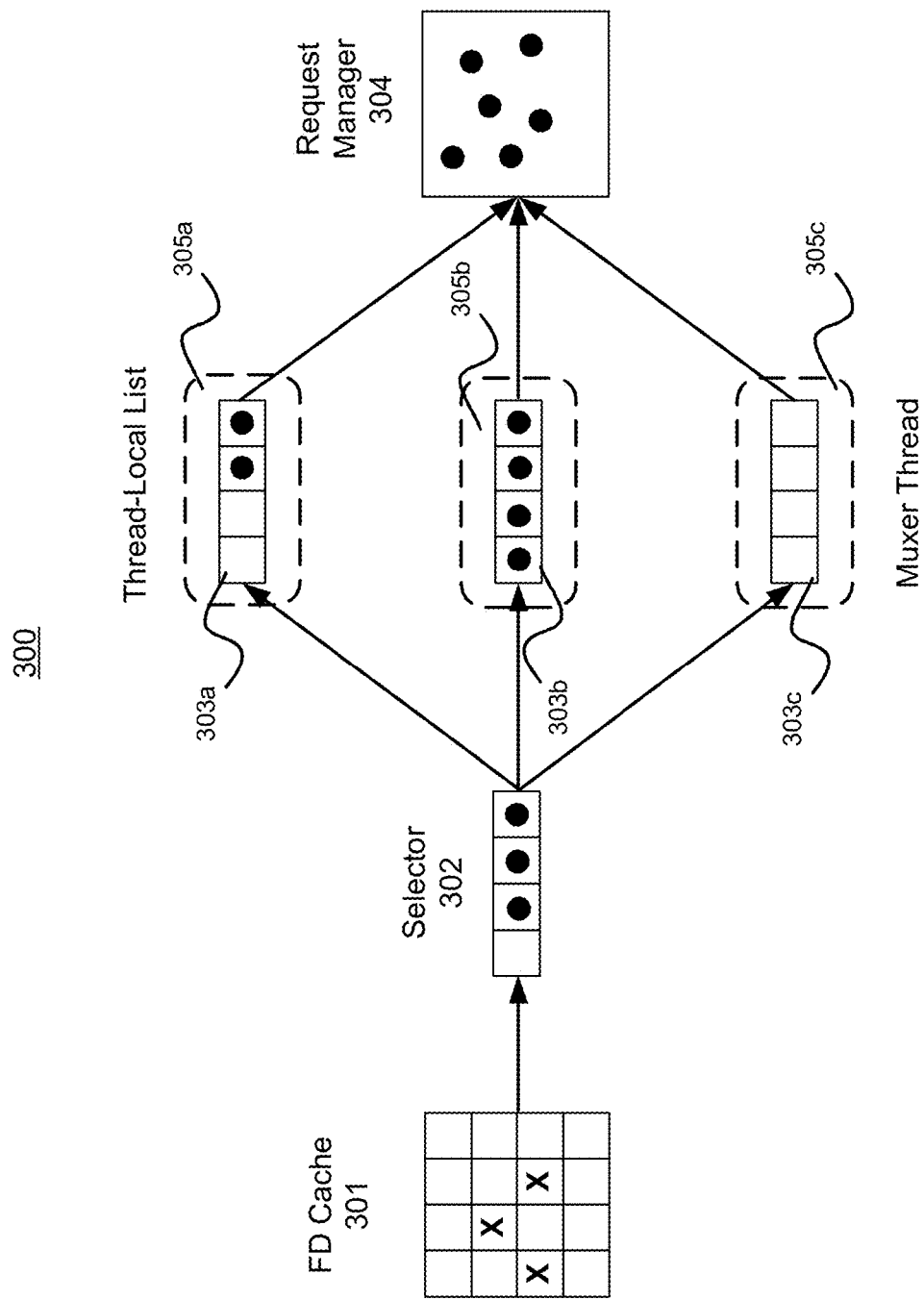
FIG. 3 shows an illustration of supporting simple muxing in accordance with various embodiments of the invention.

FIG. 3 shows an illustration of supporting simple muxing in a middleware machine environment. As shown in FIG. 3, a file descriptor cache, or FD cache 301, which is maintained by an operating system (OS) in a middleware machine environment 300, can contain one or more read-ready file descriptors, such as sockets (marked with cross). Here, scanning a large cache and/or maintaining concurrent access to a large cache can be inefficient in the OS.

A poll device, such as a selector 302, which may be exposed via a selector interface, can include a queue of read-ready file descriptors, such as sockets (shown as dots in the list). The selector 302 can be used by one or more muxer threads 305*a*-305*c* to poll the FD cache 301. A thread 305*a*-305*c* may be blocked at the selector 302, e.g. while placing a Selector.select( ) function call, waiting for a scan on the FD cache 301 to complete. Then, the thread 305*a*-305*c* can copy read-ready file descriptors into the selector list 302.

Each muxer thread 305*a*-305*c* can maintain a thread-local list 303*a*-303*c*. The thread-local list 303*a*-303*c* includes a list of read-ready sockets (shown as dots in the list) that can be processed by the thread 305*a*-305*c*. Since the list 303*a*-303*c* is thread-local, other threads may not be able to help processing that list, even when the other threads are idle.

As shown in FIG. 3, the thread-local lists 303*a*-303*c* have a different number of dots, which represent a different amount of work handed over to individual muxer threads. For example, the muxer thread 305*b* may need to handle a long list of read-ready sockets, while the muxer thread 305*c* is idle.

A request manager 304 can be used to handle one or more requests from different servers in the middleware machine environment 300. The request manager 304 is a component with multiple queues, to which the requests prepared by the muxer threads 305*a*-305*c* can be added. These queues can be first-in-first-out (FIFO) queues, or priority queues. Additionally, constraints on the thread counts may be enforced on the various queues in the request manager 304.

As shown in FIG. 3, only one selector 302 is provided for the multiple muxer threads 305*a*-*c*. For example, when the muxer thread 305*b* obtains a read-ready socket, it has the work all in its own thread-local list 303*b*. At the same time, other muxer threads 305*a* and 305*b* may be waiting to enter Selector.select( ). Thus, the performance of the muxer may suffer, since the read-ready sockets are processed under a single-thread model.

Furthermore, once the muxer thread 305*b* returns from Selector.select( ) another thread, e.g. 305*c*, may enter Selector.select( ) again. In such a case, since the selector 302 has just been emptied, it may likely block the muxer thread 305*c*. Thus, there may be a situation where most of the muxer threads are waiting, while one muxer thread is busy.

Thus, in the example, as shown in FIG. 3, there may be contention in accessing the shared selector 302 and FD cache 301 by the different muxer threads 305*a*-305*c*. Furthermore, the non-sharing of read-ready sockets can result in thread starvation, where idle threads may be available but unable to start processing read-ready sockets.

Additional information about simple muxing is disclosed in U.S. patent application Ser. No. 13/109,871, filed May 17, 2011, entitled "SYSTEM AND METHOD FOR PARALLEL MUXING BETWEEN SERVERS IN A CLUSTER", which application is hereby incorporated by reference.

Parallel Muxing

Figure 4:
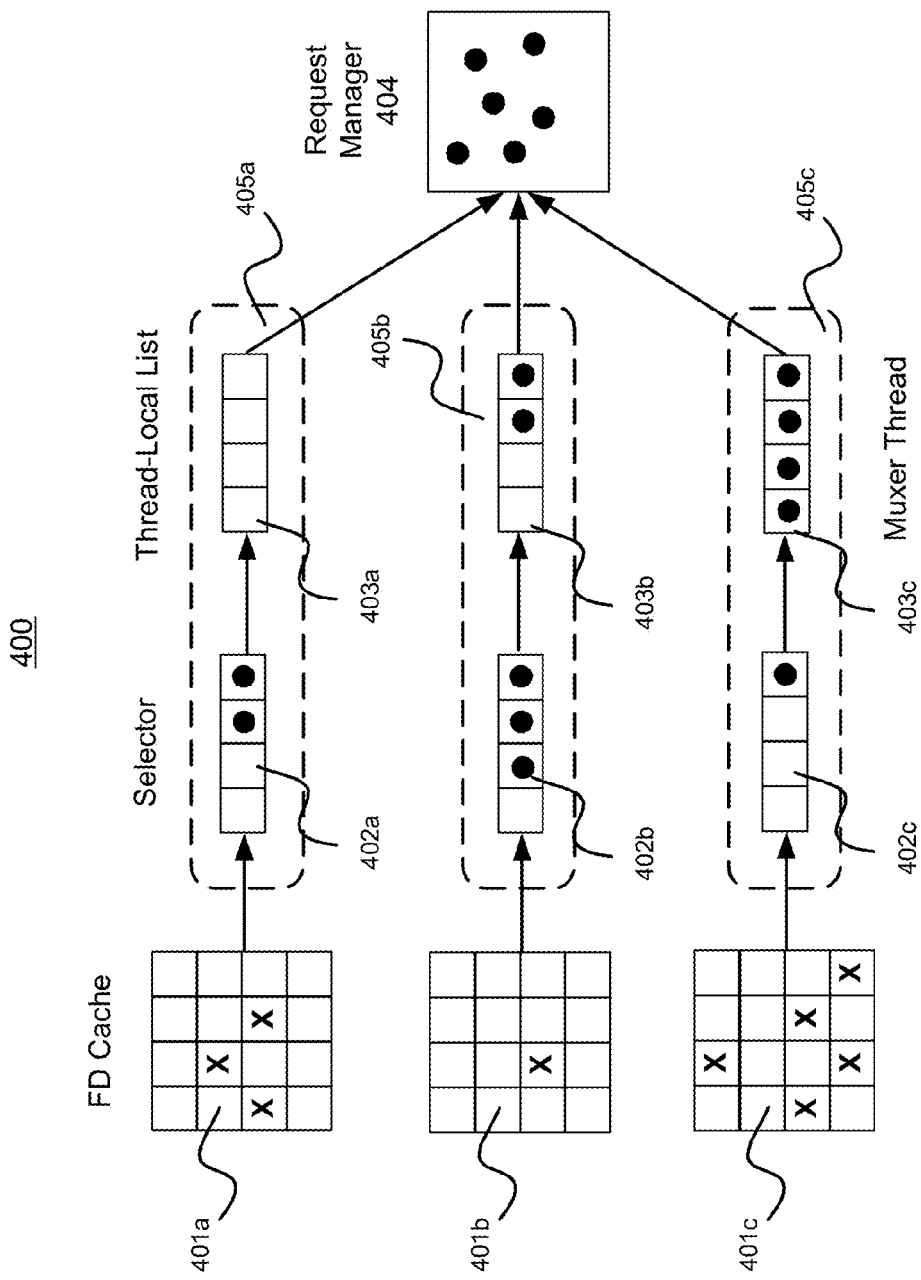
FIG. 4 shows an illustration of supporting parallel muxing in accordance with various embodiments of the invention.

FIG. 4 shows an illustration of supporting parallel muxing in a middleware machine environment. As shown in FIG. 4, the middleware machine environment 400 can include a number of selectors 402*a*-*c*, each of which can be used to poll one or more file descriptor caches, or FD caches 401*a*-*c*. Additionally, there can be exactly the same number of worker threads, or muxer threads 405*a*-*c*, in the middleware machine environment 400, with each muxer thread 405*a*-*c* maintaining a thread-local list 403*a*-*c*.

Using parallel muxing, each selector may be accessed by only one muxer thread. For example, the muxer thread 405*a* uses the selector 402*a*, while the muxer threads 405*b* use the selector 402*b* and the muxer threads 405*c* use the selector 402*c*. The worker threads 405*a*-*c* poll the selectors 402*a*-*c* single-threadedly and process read-ready sockets single-threadedly. The using of individual selectors 402*a*-*c* allows a reduction in the arrival rate per selector, and, therefore reduces the contention on the system resources.

Using parallel muxing, the unevenness of load caused by single selector can be resolved. Furthermore, there may still be a need for achieving even distribution of work among different selectors and muxer threads.

Thus, in the example as shown in FIG. 4, the contention in accessing the selectors 402*a*-*c* and FD caches 401*a*-*c* by the muxer threads 405*a*-*c* can be reduced. Furthermore, the FD cache scanning efficiency can improve by using several smaller caches 401*a*-*c*, instead of one large cache 301 as shown in FIG. 3, for comparable sets of FDs. Additionally, the design as shown in FIG. 4 may still suffer from thread starvation because that the muxer threads 405*a*-*c* do not share the read-ready sockets.

Additional information about parallel muxing is disclosed in U.S. patent application Ser. No. 13/109,871, filed May 17, 2011, entitled "SYSTEM AND METHOD FOR PARALLEL MUXING BETWEEN SERVERS IN A CLUSTER", which application is hereby incorporated by reference.

Work Sharing Muxing

Figure 5:
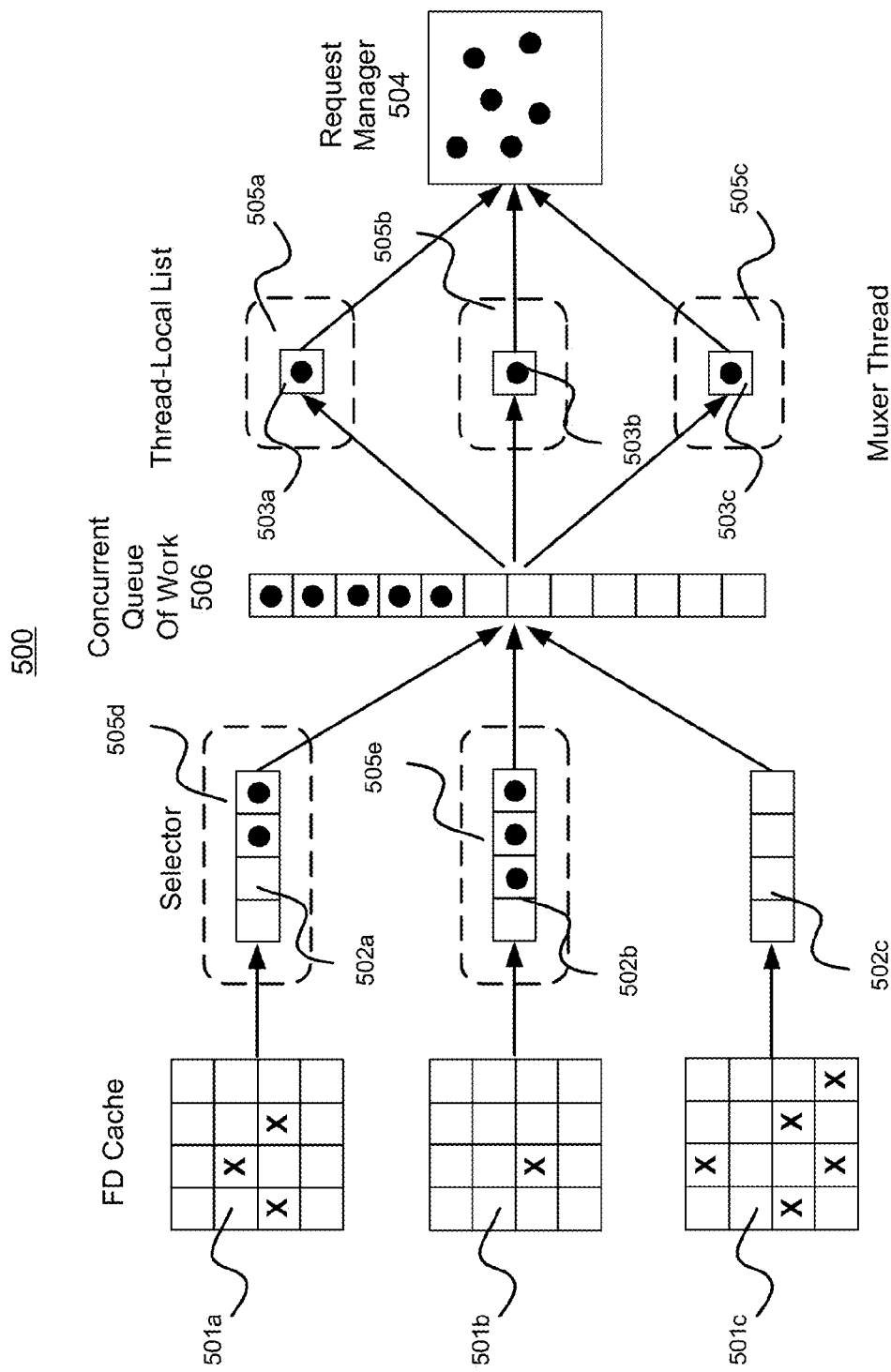
FIG. 5 shows an illustration of supporting work sharing muxing in accordance with various embodiments of the invention.

FIG. 5 shows an illustration of supporting work sharing muxing in accordance with various embodiments of the invention. As shown in FIG. 5, the middleware machine environment 500 includes a shared queue, such as a concurrent queue of work 506, into which one or many selectors 502a-c can be emptied. The shared queue 506 can contain both read-ready sockets and/or related selectors 502a-c.

By joining the blocking queues of the selectors 502a-c into one shared queue 506, the queue processing model avoid requiring the individual worker threads 505a-e to process all read-ready sockets sequentially. The worker threads 505a-e can be activated to enable concurrent processing of read-ready sockets from individual selectors 502a-c. Thus, the shared queue 506 can improve the concurrent properties of the FD caches 501a-c maintained by the OS, and the queue processing model offers reduced end-to-end latency.

Using this queue processing model, the one or many read-ready sockets returned from individual selectors 502a-c, and selectors 502a-c themselves can be shared among multiple worker threads, or muxer threads 505a-c. As shown in FIG. 5, the system can include one or more muxer threads 505a-c, each of which can obtain one read-ready socket from the shared queue of work 506. Thus, each thread-local list 503a-503c may only have a length of one. Additionally, one or more muxer threads 505d-e can use the selectors 502a-b to poll the FD caches 501a-b.

As long as the shared queue 506 is not empty, the muxer threads 505a-e may not get suspended in order to achieve high throughput for the muxer, since the queue processing model can avoid having some threads blocked in Selector.select while other threads may have more than one socket to process. Thus, this queue processing model can reduce the queue waiting time of requests that otherwise would be wasted in the thread-local list.

In accordance with various embodiments of the invention, the number of muxer threads (MUXERS) can be less than or equal to the number of the selectors (SELECTORS), or 1<=SELECTORS<=MUXERS. The muxer threads can potentially be blocked in Selector.select( ) at every selector. Thus, there may be up to the number of SELECTORS muxer threads blocked in Selector.select( ). Once a muxer thread returns from the Selector with a list of read-ready sockets, one or more threads may be ready to take work from the shared queue 506, while some of the muxer threads may be busy reading socket at the time. The number of the threads that are ready to read the read-ready sockets can be up to the number of MUXERS-SELECTORS, which represents the difference between the number of MUXERS and the number of SELECTORS.

When a muxer thread 505a-e is idle, the worker can either be blocked trying to get read-ready sockets from a selector 502a-c, or be blocked trying to get read-ready sockets from the shared blocking queue 506. When one or many read-ready sockets become available, the read-ready sockets and their selectors 502a-c can end up in the shared blocking queue 506 in the order that guarantees system-wide progress.

In accordance with various embodiments of the invention, every worker thread 505d-e that returns from the selector can retain one last read-ready socket. Every worker thread 505a-c that gets unblocked from the shared queue 506 can have a read-ready socket. The worker thread 505a-c can continuingly process these sockets (e.g. read a request), and then return to get more read-ready sockets from the shared queue 506. Eventually a selector 502a-c can be taken from the shared queue 506, in which case the worker thread 505a-c can proceed to get more read-ready sockets from that selector 502a-c.

Since the order, in which the read-ready sockets are processed, is based on the selector 502a-c, there is a larger opportunity for having more read-ready sockets in the shared queue 506 using this queue processing model. As a result, the read-ready sockets can be obtained from the selector 502a-c without blocking, and significant response time reductions can be achieved for network-intensive workloads.

Furthermore, the sharing scheme enables the worker threads 505a-e to continuously obtain read-ready sockets from the selectors 502a-c and process them without the need to get suspended or to perform context switches. Thus, this queue processing model can achieve a great degree of concurrency.

FIG. 6 shows an illustration of exemplary pseudo code that supports work sharing muxing in accordance with various embodiments of the invention. As shown in FIG. 6, a Muxer class can be defined (Lines 1-31). A queue of work can be set up and populated with a number of Selectors (Line 4). Furthermore, when the Muxer is running, an infinite loop (Lines 13-30) can be used for processing sockets. For each iteration in the infinite loop, the Muxer class can determine whether an entry obtained from an ArrayList is a Selector or a Selection-Key (Line 18). In the case the entry is a Selector, the Muxer can try to push the content in the Selector to queue of work (Lines 18-25). Otherwise, the Muxer can establish the readReadyChannel using the SelectionKey (Lines 26-29).

FIG. 7 shows an illustration of other exemplary pseudo code that supports work sharing muxing in accordance with various embodiments of the invention. As shown in FIG. 7, a different Muxer class can be defined (Lines 1-31) to be more eager in sharing outstanding work, e.g. if the ArrayList is not empty, the Muxer class can push its contents to the queue of jobs using the jobs.offerAll function call (Lines 17-21). Thus, within the infinite loop, the Muxer class tries to dump non-empty list of work on every iteration. Additionally, the Muxer class can avoid concurrent access to the queue in a manner similar to the thread-local list.

Furthermore, in order to keep as many muxer threads busy reading sockets as possible, instead of waiting in Selector, the Muxer class tries to add the selector to the queue as late as possible. The reason is that, if the time from the last poll is longer, then it is more likely that the worker thread can return immediately, thus blocking less. Otherwise, if a worker thread enters the Selector.select too soon, the call would more likely get the worker thread blocked, since the selector list was emptied only a short while ago and the file descriptor cache may not have enough time to get populated again.

Figure 8:
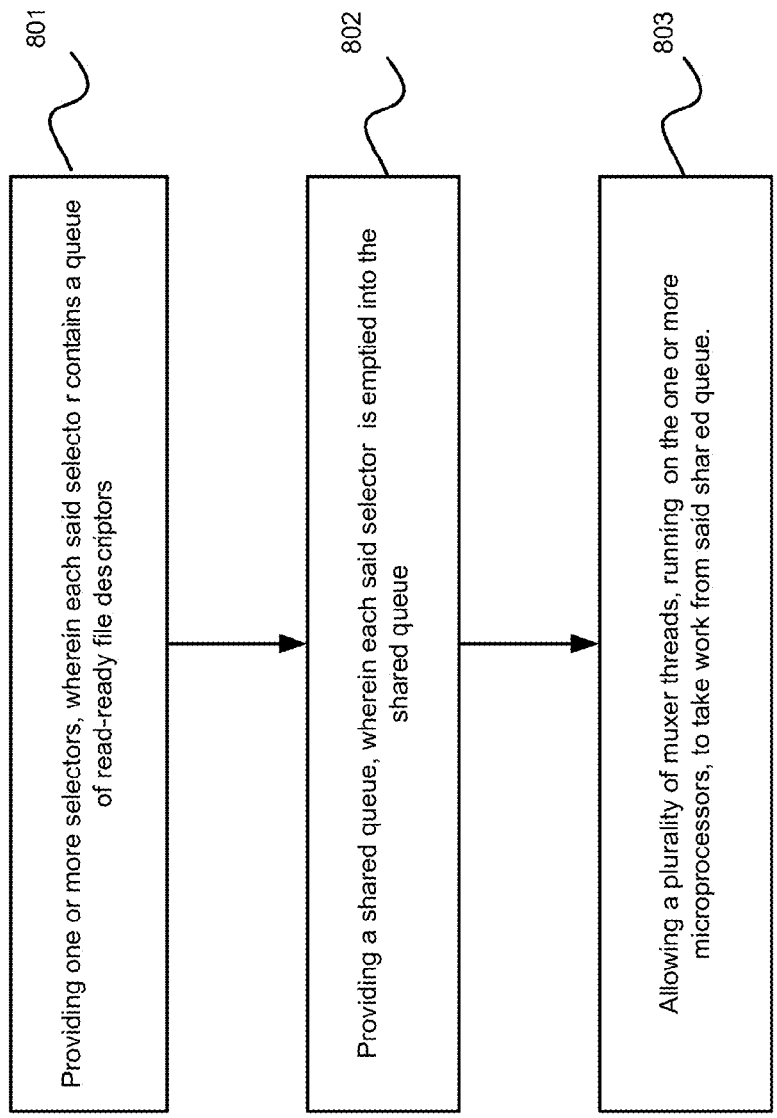
FIG. 8 illustrates an exemplary flow chart for supporting work sharing muxing in accordance with an embodiment of the invention.

FIG. 8 illustrates an exemplary flow chart for supporting work sharing muxing in accordance with an embodiment of the invention. As shown in FIG. 8, at step 801, the system can provide one or more selectors, wherein each said selector contains a queue of read-ready file descriptors. Then, at step 802, the system can provide a shared queue, wherein each said selector is emptied into the shared queue. Furthermore, at step 803, the system allows a plurality of muxer threads, running on the one or more microprocessors, to take work from said shared queue.

In accordance with various embodiments of the invention, the efficiency of the system can be achieved based on efficient concurrent selection of one selector out of many selectors, which enables concurrent selection from multiple small FD caches instead of one large cache. Furthermore, the use of non-blocking sharing of read-ready sockets can eliminate thread starvation. It is beneficial to use a non-blocking bulk add operation for a concurrent queue with a fixed memory footprint (e.g., jobs.offerAll( . . . ) as shown in line 20 of FIG. 7). Additionally, the system can guarantee timely processing of read-ready sockets and can improve other progress properties of the system as a whole, by ensuring the order, in which the selector is shared after the sockets are selected (e.g. the order in which the read-ready sockets are added in connection with the selector).

Thus, using work sharing muxing, the system can guarantee efficient queue progressing and allow the sharing of various mutable states, and can eliminate thread starvation during the concurrent processing of read-ready sockets.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for supporting work sharing multiplexing in a cluster, comprising:
   one or more microprocessors;
   a plurality of file descriptor caches that each contain one or more read-ready file descriptors;
   a plurality of selectors and a plurality of selector queues, wherein each of said plurality of selectors is associated with a different selector queue of said plurality of selector queues, and wherein each of said plurality of selectors polls an associated file descriptor cache of said plurality of file descriptor caches, and writes read-ready file descriptors from the associated file descriptor cache to the associated selector queue of said plurality of selector queues;
   a single shared queue coupled to said plurality of selectors, wherein each selector queue of said plurality of selector queues empties file descriptors from the associated selector queue of the plurality of selector queues into the single shared queue such that all read-ready file descriptors polled from the plurality of file descriptor caches by the plurality of selectors are provided to the single shared queue; and
   a plurality of worker threads, running on the one or more microprocessors, that operates to process said read-ready file descriptors provided to said single shared queue.

2. The system according to claim 1, wherein said single shared queue includes read-ready file descriptors and related selectors of said plurality of selectors.

3. The system according to claim 2, wherein:
   a thread associated with a said selector is blocked when it is waiting for a scan on the associated file descriptor cache to complete.

4. The system according to claim 2, wherein:
   a thread associated with a said selector operates to copy the one or more read-ready file descriptors into the one or more selectors.

5. The system according to claim 1, wherein:
   each said worker thread maintains a thread-local list of read-ready sockets that it is processing.

6. The system according to claim 1, further comprising:
   a request manager that is capable of handling one or more requests from different servers in the cluster.

7. The system according to claim 6, wherein:
   the request manager contains multiple queues where the one or more requests prepared by the plurality of worker threads are added to.

8. The system according to claim 1, wherein:
   there are more said worker threads than said selectors.

9. The system according to claim 1, wherein:
   said worker threads operate to continuously obtain read-ready sockets from the shared queue and process them without the need to get suspended or to perform context switches.

10. The system according to claim 1, wherein:
    a worker thread that returns from a said selector can retain one last read-ready socket.

11. A method for supporting work sharing multiplexing in a cluster, comprising:
    providing a plurality of file descriptor caches that each contain one or more read-ready file descriptors;
    providing a plurality of selectors and a plurality of selector queues, wherein each of said plurality of selectors is associated with an associated file descriptor cache of the plurality of file descriptor caches and a different selector queue of said plurality of selector queues;
    providing a single shared queue coupled to said plurality of selectors;
    polling said plurality of file descriptor caches with said plurality of selectors wherein each selector polls the associated file descriptor cache;
    writing read-ready file descriptors from each selector of said plurality of selectors to the selector queue associated with said each selector;
    emptying the read-ready file descriptors from all of the plurality of selector queues into the single shared queue such that all read-ready file descriptors polled from the plurality of file descriptor caches by the plurality of selectors are provided to the single shared queue; and
    processing said read-ready file descriptors provided to said single shared queue with a plurality of worker threads.

12. The method according to claim 11, wherein said single shared queue includes read-ready file descriptors and related selectors of said plurality of selectors.

13. The method according to claim 12, further comprising:
    configuring a thread associated with each selector to be blocked when it is waiting for a scan on the associated file descriptor cache to complete.

14. The method according to claim 12, further comprising:
    configuring a thread associated with each selector to copy the one or more read-ready file descriptors into the one or more selectors.

15. The method according to claim 11, further comprising: configuring each said worker thread to maintain a thread-local list of read-ready sockets that it is processing.

16. The method according to claim 11, further comprising: providing a request manager that is capable of handling one or more requests from different servers in the cluster.

17. The method according to claim 16, further comprising: configuring the request manager to contain multiple queues where the one or more requests prepared by the plurality of worker threads are added to.

18. The method according to claim 11, further comprising: providing more worker threads than said selectors.

19. The method according to claim 11, further comprising: configuring one or more said worker threads to continuously obtain read-ready sockets from the selectors and process them without the need to get suspended or to perform context switches.

20. A non-transitory machine readable storage medium having instructions stored thereon for supporting work sharing multiplexing in a cluster, which instructions, when executed, cause a system to perform steps comprising:

providing a plurality of file descriptor caches each containing one or more read-ready file descriptors;

providing a plurality of selectors and a plurality of selector queues, wherein each of said plurality of selectors is associated with an associated file descriptor cache of the plurality of file descriptor caches and a different selector queue of said plurality of selector queues;

providing a single shared queue coupled to said plurality of selectors;

polling said plurality of file descriptor caches with said plurality of selectors wherein each selector polls the associated file descriptor cache;

writing read-ready file descriptors from each selector of said plurality of selectors to the selector queue associated with said each selector;

emptying the read-ready file descriptors from all of the plurality of selector queues into the single shared queue such that all read-ready file descriptors polled from the plurality of file descriptor caches by the plurality of selectors are provided to the single shared queue; and processing work said read-ready file descriptors provided to said single shared queue with a plurality of worker threads.

* * * * *

UNITED STATES PATENT AND TRADEMARK OFFICE
CERTIFICATE OF CORRECTION

Page 1 of 1

PATENT NO.           : 9,086,909 B2
APPLICATION NO.      : 13/756207
DATED                : July 21, 2015
INVENTOR(S)          : Otenko It is certified that error appears in the above-identified patent and that said Letters Patent is hereby corrected as shown below:

In the Drawings:

On sheet 1 of 8, in FIG. 1, under reference numeral 104, line 1, delete "Ma chine" and insert -- Machine --, therefor.

On sheet 1 of 8, in FIG. 1, under reference numeral 106, line 1, delete "Hardw are" and insert -- Hardware --, therefor.

On sheet 8 of 8, in FIG. 8, under reference numeral 801, line 1, delete "selecto r" and insert -- selector --, therefor.

On sheet 8 of 8, in FIG. 8, under reference numeral 801, line 2, delete "des criptors" and insert -- descriptors --, therefor.

On sheet 8 of 8, in FIG. 8, under reference numeral 803, line 2, delete "shar ed" and insert -- shared --, therefor.

In the Specification:

In column 7, line 28, delete "data" and insert -- data. --, therefor.

In the Claims:

In column 10, line 19, in claim 20, before "said" delete "work".

Signed and Sealed this
Seventeenth Day of May, 2016

Michelle K. Lee
*Director of the United States Patent and Trademark Office*